United States Patent [19]

Thatcher

[11] 4,445,406

[45] May 1, 1984

[54] SPIN TRIMMER FOR REMOVING FLASHING FROM THE TOPS OF PLASTIC BOTTLES

[76] Inventor: Alan J. Thatcher, 9386 La Gloria Dr., Alta Loma, Calif. 91701

[21] Appl. No.: 428,406

[22] Filed: Sep. 29, 1982

[51] Int. Cl.³ .......................... B23B 3/04; B23B 5/14
[52] U.S. Cl. .......................................... 82/46; 82/101; 83/171; 83/914; 264/536; 264/161; 425/806
[58] Field of Search .................... 82/46, 101; 264/536, 264/161; 425/806; 83/171, 914

[56] References Cited

U.S. PATENT DOCUMENTS 3,800,638  4/1974  Duikers et al. ........................ 82/101
3,962,938  6/1976  Reilly et al. ...................... 82/101 X
3,967,516  7/1976  Griesing et al. .................. 82/101 X Primary Examiner—Frank T. Yost
Attorney, Agent, or Firm—Edgar W. Averill, Jr.

[57] ABSTRACT

A plastic bottle is held from a dome molded above the bottle neck and the dome-held bottle is moved along a horizontal groove by a moveable belt. A heated knife is held against the turning bottle neck and cuts the dome and undesirable flashing from the bottle at the top of the neck.

6 Claims, 9 Drawing Figures

SPIN TRIMMER FOR REMOVING FLASHING FROM THE TOPS OF PLASTIC BOTTLES

BACKGROUND OF THE INVENTION

The field of the invention is plastic forming apparatus, and the invention relates more particularly to the forming method known as blow molding and even more particularly to the operation relating to blow molding known as spin trimming. This process provides a highly efficient and effective method for removing the unwanted flashing from the top of hollow blow-molded objects such as bottles.

An early spin trimming apparatus is shown in U.S. Pat. No. 3,429,211 entitled "Apparatus For Trimming The Neck Of Hollow Plastic Articles". This patent discloses a device which grasps a bottle below the neck by a groove formed in the neck. A knife edge is held against a notch formed above the neck. The bottle is turned by being held against the knife edge and a protrusion which fits the groove in the neck while at the same time the groove is contacted by a moving belt on the other side and pushed against the knife in a turning action. The knife is positioned on an angle so that as the bottle turns against it, the knife cuts further into the neck.

A more elaborate device is shown in U.S. Pat. No. 3,675,521 entitled "Article Trimmer". This device holds the bottle from above the neck and also holds the bottle around the wall thereof.

U.S. Pat. No. 4,305,904 discloses another spin trimmer which supports the bottle from above the neck and moves it along the cutting knife held parallel to and below the moving belt. While spin trimmers find wide application in the finishing of blow molded objects, this process has several shortcomings. For many types of polymers, the knife blade, instead of cutting through the polymer wall, tends to collapse and deform the wall and the process is inoperative. This is particularly true for polymers such as polyvinyl chloride bottles and polyethylene terephthalate bottles which are widely used for soft drinks. Furthermore, many of the prior art spin trimmers are deficient in holding the bottle steady in a verticle position and instead tend to wobble as they move along the device. This leads to an uneven neck opening.

BRIEF SUMMARY OF THE INVENTION

It is an object of the present invention to provide a spin trimmer capable of removing the tops from blow molded plastic objects many of which were formerly believed untrimmable by this method.

The present invention is for a spin trimmer for making a smooth cut at the top of the a blow molded hollow plastic object such as a bottle. The spin trimmer has a support frame, a drive belt support bar affixed to the frame, and a moveable belt positioned against the support bar. A bottle dome support bar having at least two grooves formed longitudinally thereon is also supported by the frame and is held parallel to the drive belt support bar and positioned so that the upper groove is above the central axis of the moveable belts and the lower groove is below the central axis of the moveable belt. A horizontally positioned knife means is held below the support bar and projects in the direction of the drive belt support bar. The knife means are heated to a temperature sufficient to soften the plastic material from which the object is blown. The combination of the above-described apparatus with a bottle having a reinforced dome is also used with the present invention.

DESCRIPTION OF THE PREFERRED EMBODIMENTS

Figure 1:
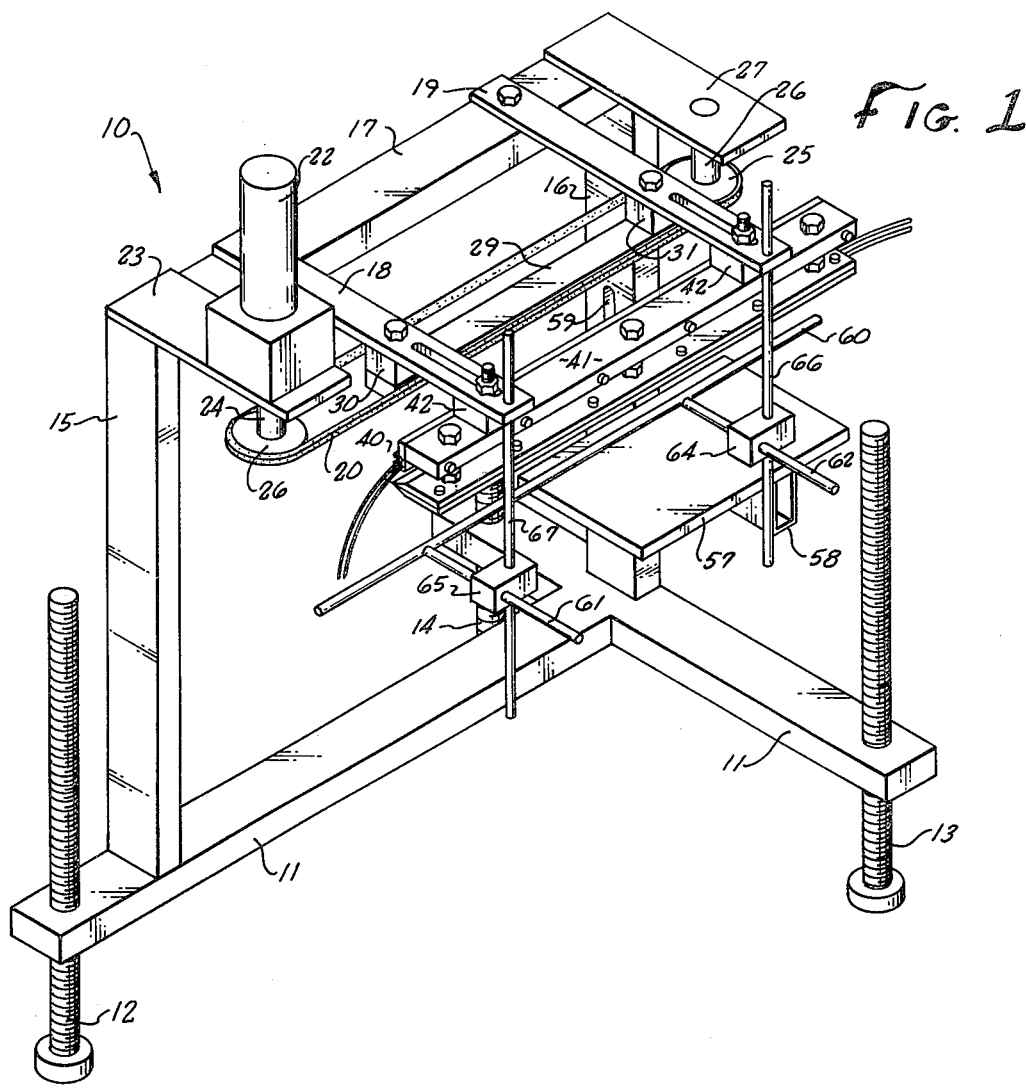
FIG. 1 is a perspective view of the spin trimmer of the present invention.

A spin trimmer 10 is supported by a frame 11 which has three adjustable legs 12, 13 and 14 threaded therethrough. Uprights 15 and 16 support frame arm 17 which in turn holds cantilever arms 18 and 19. Moveable belt 20 is turned by pulley 21 which is driven through shaft 24 of variable speed motor 22 which is held on support shelf 23. Variable speed motor 22 is controlled by conventional controller 22a shown in FIG. 3. Motor 22 is preferably electrical and controlled over a speed range from very slow to up to 90 rpm. A useful pulley diameter for pulley 21 is 4 inches and thus the moveable belt has a linear speed which may be varied up to about 1½ feet per second. Typically the apparatus is operated from about ¾ feet per second up to its maximum operating speed and speeds of up to about 2 feet per second would be expected to be useful.

Moveable belt 21 also passes over idler pulley which is held by shaft 26 to support shelf 27. As seen best in FIG. 2, belt 20 is held in a groove 28 formed along an aluminum belt support bar 29. Bar 29 is held by a pair of spacers 30 and 31 to arms 18 and 19.

Figure 2:
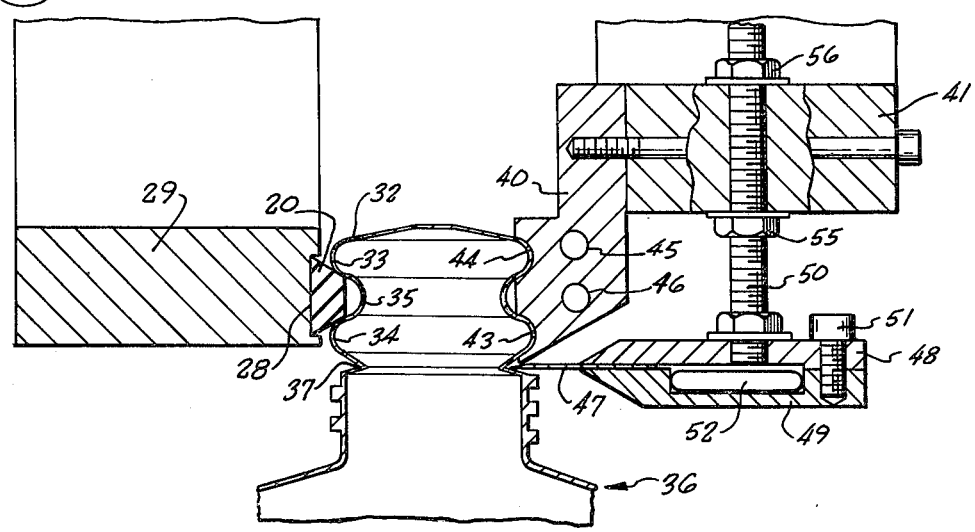
FIG. 2 is an enlarged cross-sectional side view of the dome supporting portion of the spin trimmer of the present invention.

As can also be seen in FIG. 2, the bottle which is to be trimmed has a dome generally indicated by reference character 32. Dome 32 has an upper dome ring 33 and a lower dome ring 34 with a dome groove 35 formed between them. This dome, of course, is formed as an intergral part of the blow molded bottle 36 which is being trimmed. Details are shown in FIGS. 6 through 9 and discussed more fully below. Briefly however, a notch 37 is formed at the position where the top of the bottle is to be cut and the knife edge is held so that it intersects the base of notch 37.

Moveable belt 20 is preferably a "V" belt and has two generally flat vertical surfaces as oriented in FIG. 2, one of which rests against support bar 29 and the other of which contacts upper ring 33 and lower ring 34 of dome 32. This provides a relatively steady 2-point support which helps reduce the tendency of the dome to move as the bottle is carried along the apparatus. The other side of dome 32 rests in a bottle dome support bar 40 which is bolted to an insulated base 41 which may be fabricated from an asbestos-like material or other material which has a good combination of mechanical strength and heat insulation. Base 41 is held to arms 18 and 19 through spacers 42.

Bottle dome support bar 40 is an elongated aluminum bar which runs the full length of insulated base 41. It has a lower longitudinal groove 43 running along its entire length and an upper longitudinal groove 44 which also runs the entire length of bar 40. These groove match dome rings 33 and 34 provide a steady support in combination with belt 20 for dome 32. Bar 40 may be provided with one or more cooling water lines to permit adjustment of the temperature of the bar. As explained below, the knife which cuts the dome from the bottle is heated and for some applications sufficient heat may be transferred from the blade assembly to bar 40 so that the dome is softened by contact with support bar 40. Thus, cooling lines 45 and 46 prevent such softening. At the other end of bar 40 a return line 54 conveys the cooling fluid from line 45 to line 46.

Figure 5:
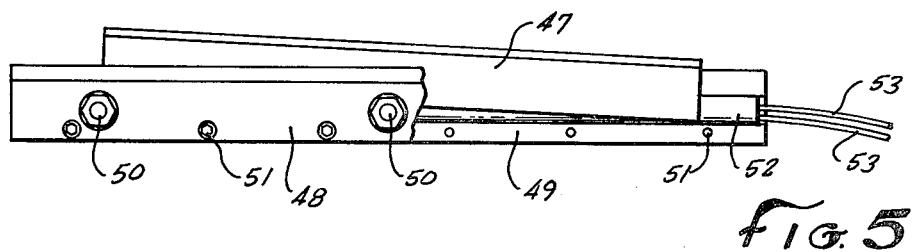
FIG. 5 is a top view partially cut away taken along line 5—5 of FIG. 4.

The dome is cut from the bottle by the knife blade 47 which is held between upper knife support bar 48 and lower knife support bar 49 which in turn is held through bolt 50 to insulated base 41. The knife support assembly is shown best in FIG. 5 where it can be seen that knife blade 47 does not run the full length of the support but is held along its entire length by the bars. The knife is preferably positioned at an angle as shown in both FIGS. 5 and 3 so that as the bottle is moved along the knife it protrudes further toward, into and through, notch 37 of bottle 36. It can also be seen that the bolts 51 may be loosened to permit adjustment of the position of knife 47. An important feature of the present invention is the provision of heating means for heating knife blade 47. This may be provided by the electrical strip heater 52 which is connected by wires 53 to a conventional controller for adjusting the temperature of the heater.

The temperature at which knife blade 47 is operated is an important feature to the present invention and will depend on numerous factors. Most importantly, the nature of the polymer from which the bottle is blown is the most important consideration. The blade should be hot enough to melt the polymer but not cause it to char. Temperatures of about 300 to 400 F. are typical although as the speed of operation increases, slightly higher temperatures may be preferable. The important feature is that the heating of the blade will significantly reduce the resistance which the blade offers against the notch 37 in the bottle. In this way, polymers that have formerly been believed to be untrimable or difficult to trim by this method by the prior methods may readily be processed.

Another important feature of the present invention is the ability to adjust the height of knife blade 47 with respect to bottle dome support bar 40. This may be done by moving nuts 55 and 56 on bolt 50. It is important that knife blade 47 meet exactly at notch 37 and the position of notch 37 can vary slightly even with bottles made out of the same mold depending upon the temperature at which the operation is being run. Thus the adjustability of the position of knife blade 47 greatly facilitates operation. In operation, the bottles are placed on shelf 57 which is held by shelf support bar 58 to upright 16. The height of the shelf is adjusted by raising and lowering bar 58 in slot 59. A second guide means is also provided consisting of a longitudinal guide rod 60 which is held through arms 62 and 63, clamps 64 and 65 to arms 66 and 67 which are held to cantilever arms 19 and 18 as shown in FIG. 1.

The bottle is then manually placed on shelf 57 after the variable speed motor 22 has been turned on and the knife blade 47 has been brought to an appropriate operating temperature. The dome rings 33 and 34 are placed in the upper and lower grooves 44 and 43 in bar 40 and the dome groove 35 is then touched against moveable belt 20. The bottle then begins to rotate in the direction indicated in the arrows in FIG. 3 and as it progresses in the direction of the belt movement, knife blade 47 progressively cuts in along notch 37 between the dome 32 and the bottle 36. The bottle then drops from the apparatus and both the bottle and dome may be conveyed to desired locations by conventional conveying means. Other automatic feed means may also be provided to feed the machine and the height adjustment permitted by legs 12, 13, and 14 greatly assist in matching the apparatus to the appropriate molding equipment.

Figure 3:
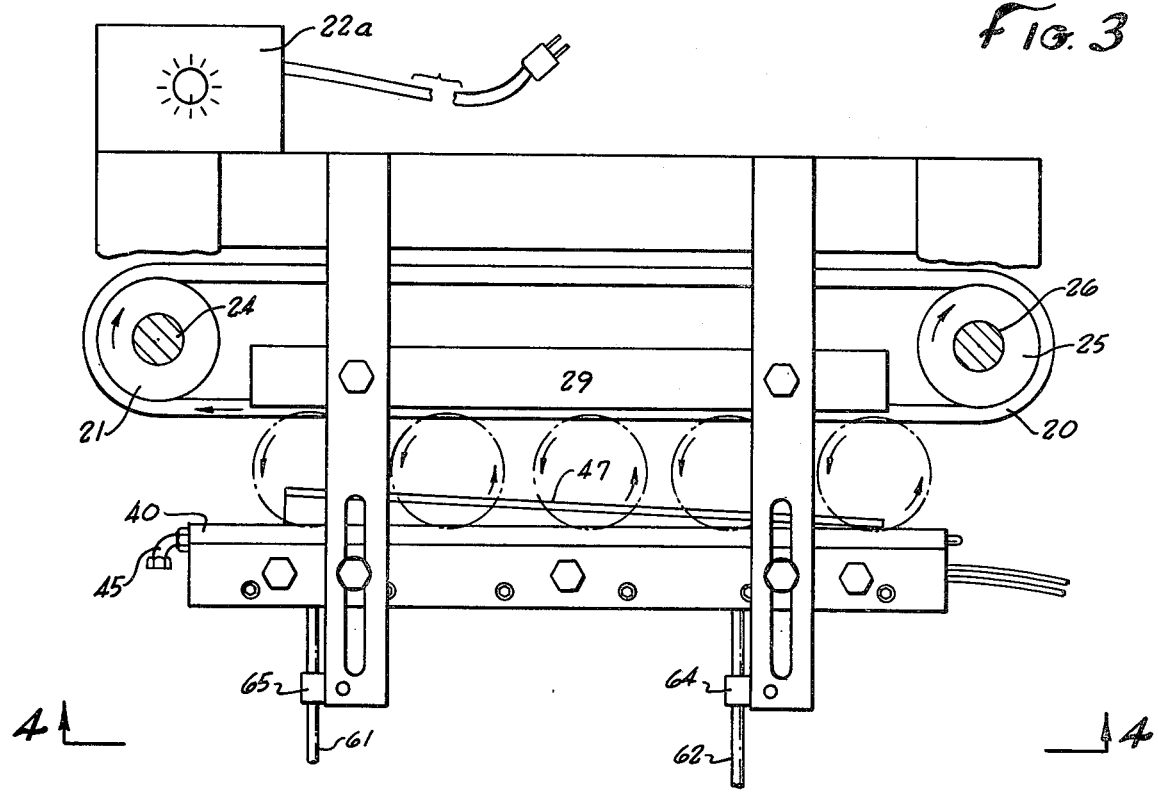
FIG. 3 is a top view of the spin trimmer of FIG. 1.
Figure 4:
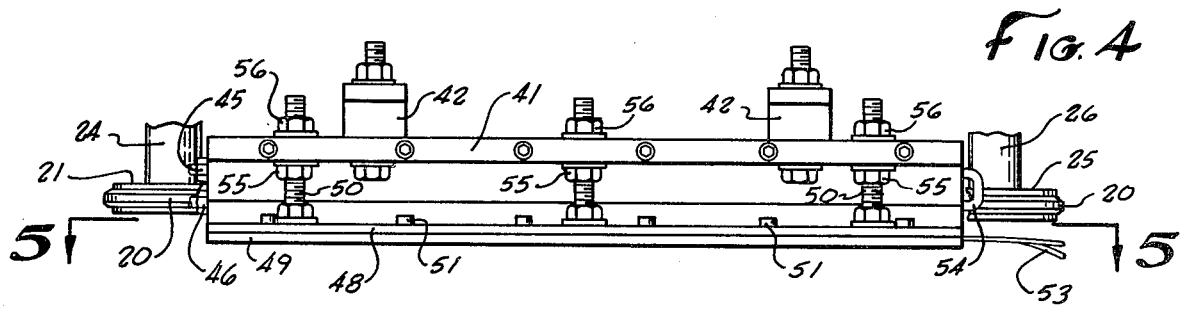
FIG. 4 is a view taken along line 4—4 of FIG. 3.

It is also shown clearly in FIG. 3 that the space between belt support bar 29 and bottle dome support bar 40 may be adjusted to permit the cutting of bottles having domes of a wide variety of diameters. By providing molds which always create a bottle having the same shape of dome edge, it is possible to use this same machine for very wide neck bottles and also bottles or other objects having small necks.

Figure 6:
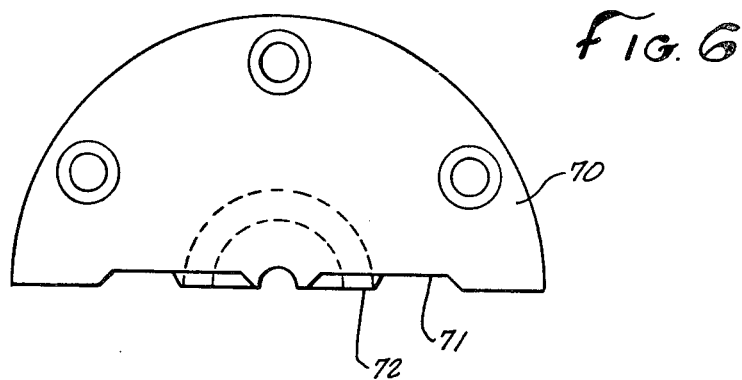
FIG. 6 is a top view of a mold for forming a dome in a hollow object used in the spin trimmer of FIG. 1.
Figure 8:
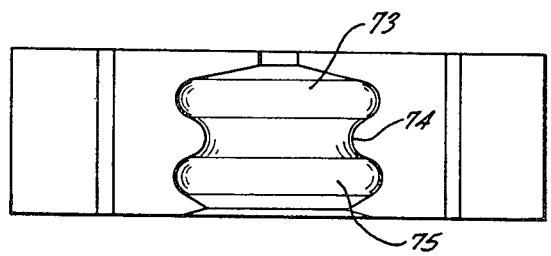
FIG. 8 is a side view of the mold portion of FIG. 6.
Figure 9:
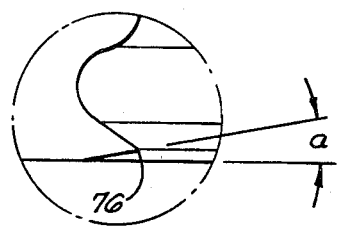
FIG. 9 is an enlarged view of the circled portion of the mold portion of FIG. 8.
Figure 7:
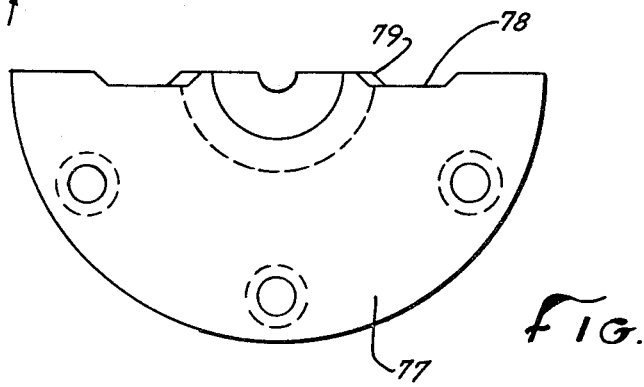
FIG. 7 is top view of the mold half which mates with the mold half of FIG. 6.

A typical mold part for forming a dome above a molded plastic object is shown in FIGS. 6 through 9. A top view of the first half 70 of the mold part is shown in FIG. 6 and the mold materials are of a conventional nature readily known to those skilled in the blow-molding art. The mold half has a mold face 71 which has a cut off ridge 72 formed therealong. The mold, of course, has an impression of one-half of the dome and a groove 73, 74 and a groove 75 form the upper dome ring 33, dome groove 35 and lower dome ring 34 respectively. The portion of the mold which forms the notch between the dome and the neck of the bottle is shown in expanded view in FIG. 9 and the angle indicated by reference character "a" is important and should be held at about 8 degrees and may vary from this number only by about 1 degree. This point of the mold indicated by reference character 76 should be maintained as sharp as possible so that a distinct notch is formed to help guide the knife blade 47 to the appropriate portion on the bottle. The second mold half is indicated by reference character 77 and it similarly has a mold face 78 and a cut off ridge 79.

It can thus be seen that the apparatus of the present invention is highly adjustable and provided with a system for supporting the dome in a particularly steady manner. It can be readily imagined that if the bottle or other object were not steady as it moved along the machine, that the cut at the top of the bottle would not be smooth. Since this is often a sealing point for the bottle, it is particularly important that the bottle move with its vertical axis steady as it is being trimmed. While the use of an asbestos-like bar has been suggested above, other means for reducing heat transfer between the heated knife blade and the bottle dome support bar may alternatively be used. Also, other cooling means such as fins or no cooling means whatsoever may be used depending upon the effectiveness of the insulation between the knife blade and the bottle dome support bar 40. Still further, insulation can be provided by adding an insulative coating or layer between the support bar 40 and the bottle dome. The important consideration is that the grooves 43 and 44 which touch dome rings 34 and 33 should not be so hot as to interfere with the contact between the bar and the dome.

The present embodiments of the invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A spin trimmer for making a smooth cut at the top of a blow molded hollow plastic object such as a bottle, said spin trimmer comprising:
   a support frame;
   a drive belt support bar affixed to said frame;
   a moveable belt positioned against the support bar, said belt having drive means for moving the belt against the support bar;
   a bottle dome support bar having at least two grooves formed longitudinally therealong, said bottle dome support bar being supported by said frame and being held parallel to the drive belt support bar and positioned so that the upper groove is above the central axis of the moveable belt and the lower groove is below the central axis of the belt; and
   horizontally positioned knife means held below said support bar and projecting in the direction of the drive belt support bar said knife means being heated to a temperature sufficient to soften the plastic material from which the object is blown.

2. The spin trimmer of claim 1 wherein said knife means are heated by an electrically heated strip heater held against said knife means.

3. The spin trimmer of claim 1 wherein said knife means is a flat sharpened blade held between two flat clamp means, at least one of said flat clamp means having an electrically heated strip heater held against it and against the knife means.

4. The spin trimmer of claim 1 wherein said bottle dome support bar is cooled by cooling means.

5. The spin trimmer of claim 4 wherein said cooling means comprise a cooling water conduit passing through the support bar.

6. A spin trimmer having a blow molded hollow plastic object held therein for making a smooth cut at the top of said object, said combination comprising:
   a hollow plastic object having a dome formed in the top thereof at a position above the surface of said object to be cut;
   a support frame;
   a drive belt support bar affixed to said frame;
   a moveable belt positioned against the support bar, said belt having drive means for moving the belt against the support bar said moveable belt abutting the dome of the hollow plastic object;
   a bottle dome support bar having at least two grooves formed longitudinally therealong, said bottle dome support bar being supported by said frame and being held parallel to the drive belt support bar and positioned so that the upper groove is above the central axis of the moveable belt and the lower groove is below the central axis of the belt; and
   horizontally positioned knife means projecting in the vertical space between the drive belt support bar and the bottle dome support bar, said knife means being heated.

* * * * *